Figure 1:
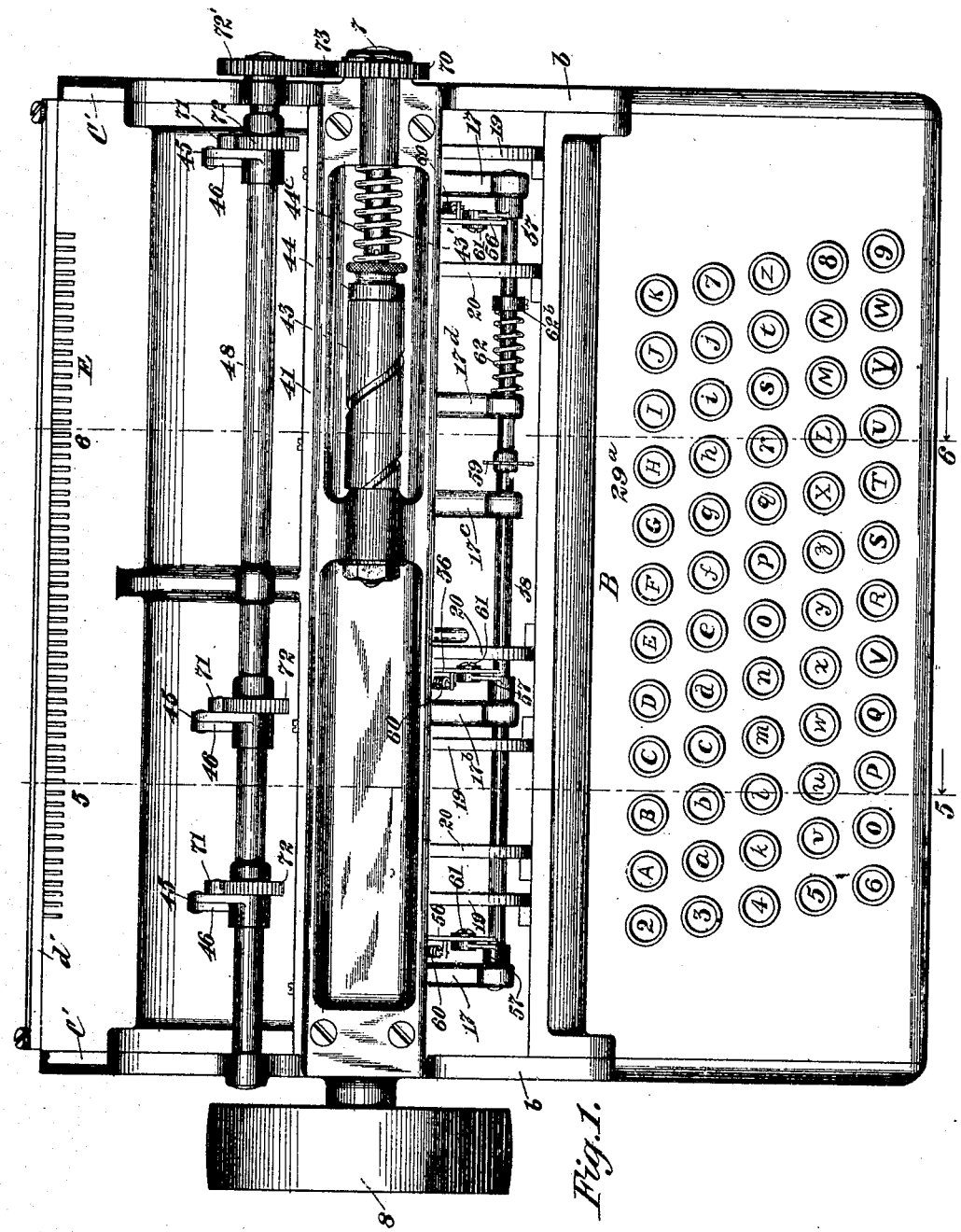

F. H. RICHARDS.
TYPOGRAPHIC MACHINE.
APPLICATION FILED APR. 18, 1901. RENEWED AUG. 7, 1907.

916,488.

Patented Mar. 30, 1909.
8 SHEETS—SHEET 1.

Witnesses:
F. C. Fliedner
F. H. Kinland

Inventor;
F. H. Richards.

F. H. RICHARDS.
TYPOGRAPHIC MACHINE.
APPLICATION FILED APR. 18, 1901. RENEWED AUG. 7, 1907.
916,488.
Patented Mar. 30, 1909.
8 SHEETS—SHEET 2.
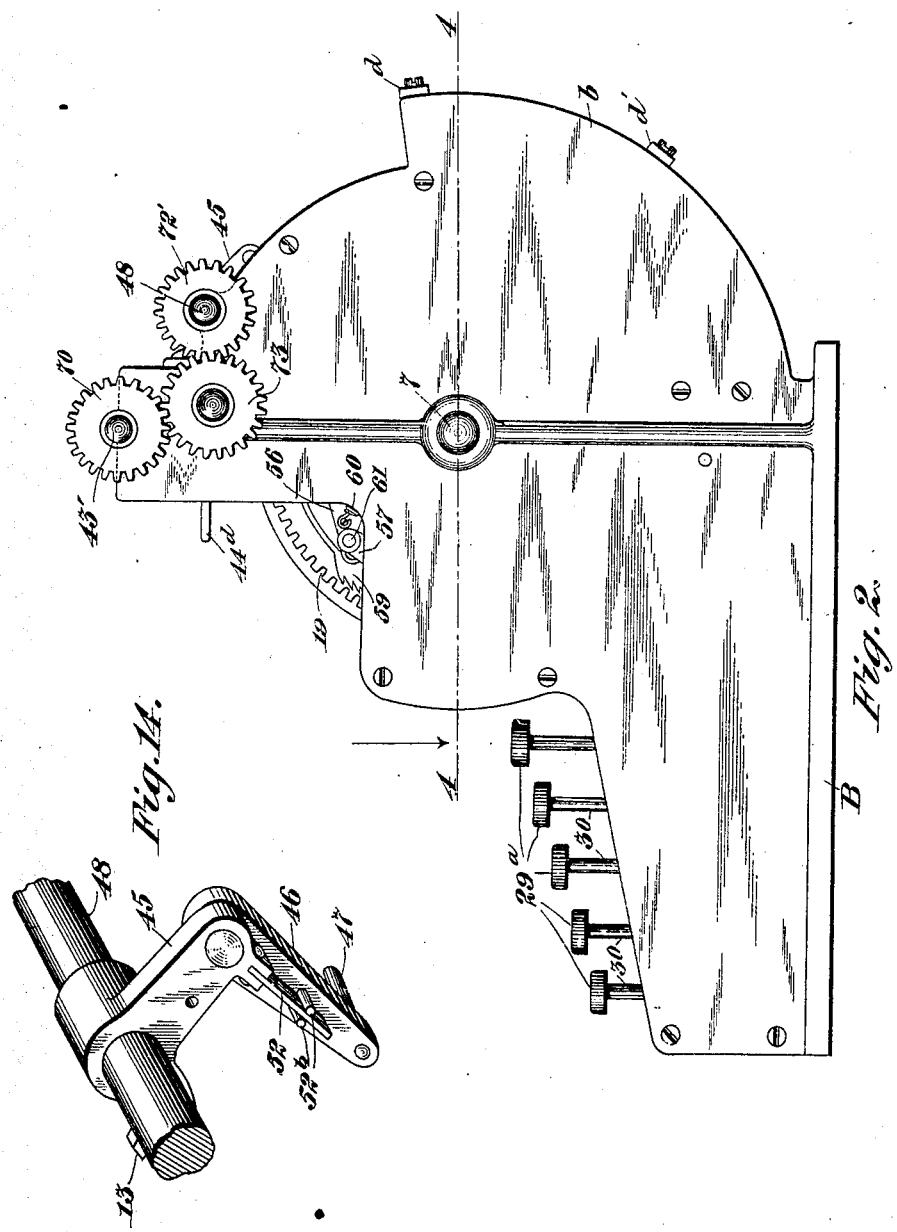

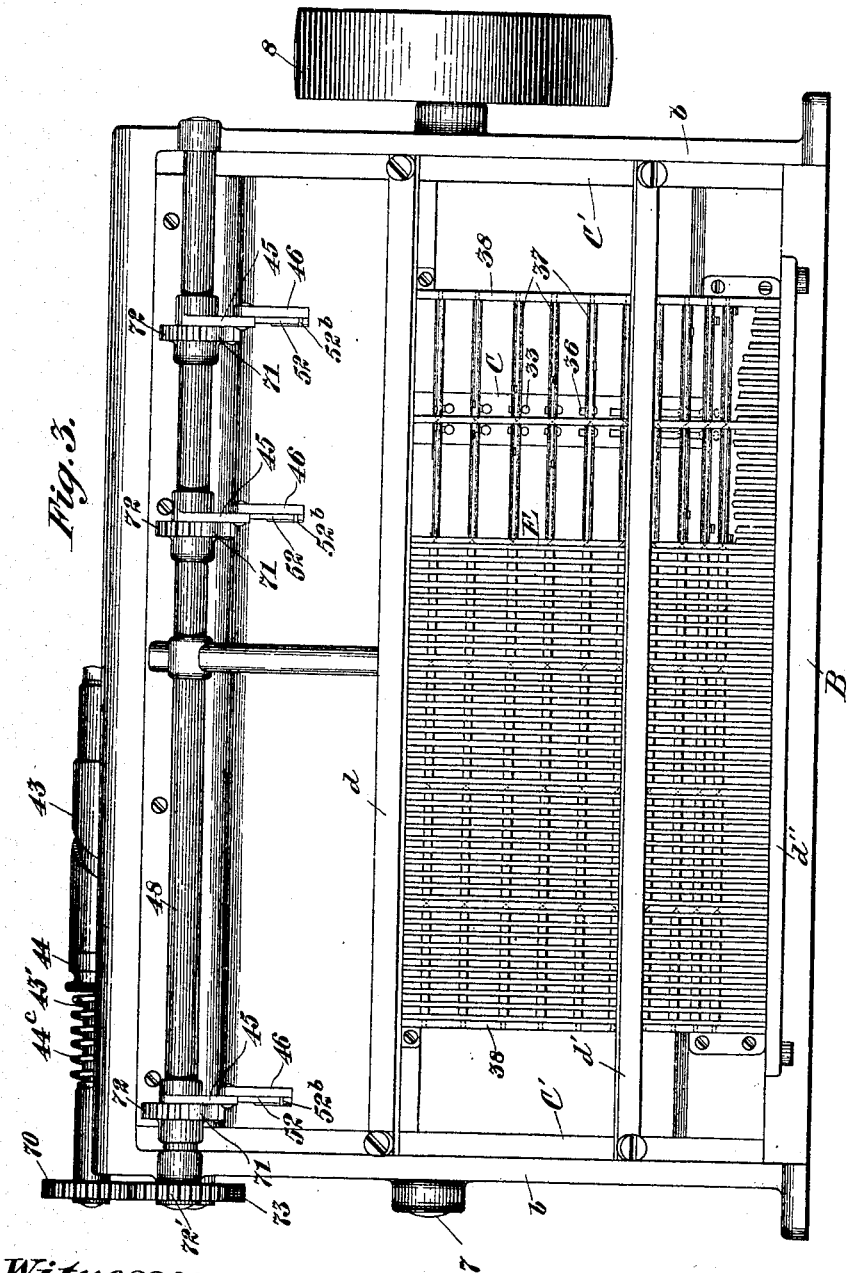

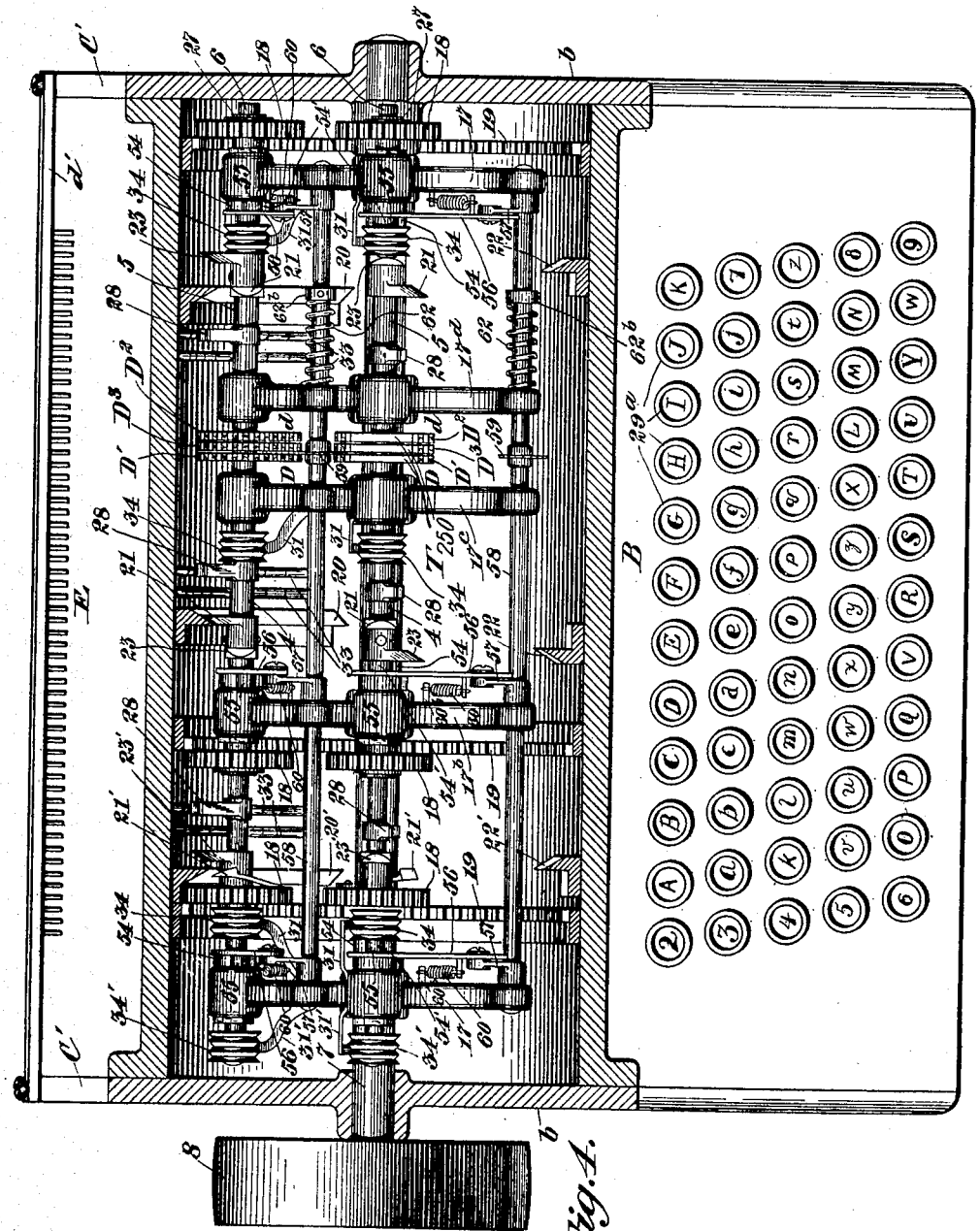

F. H. RICHARDS.
TYPOGRAPHIC MACHINE.
APPLICATION FILED APR. 18, 1901. RENEWED AUG. 7, 1907.
916,488.
Patented Mar. 30, 1909.
8 SHEETS—SHEET 5.
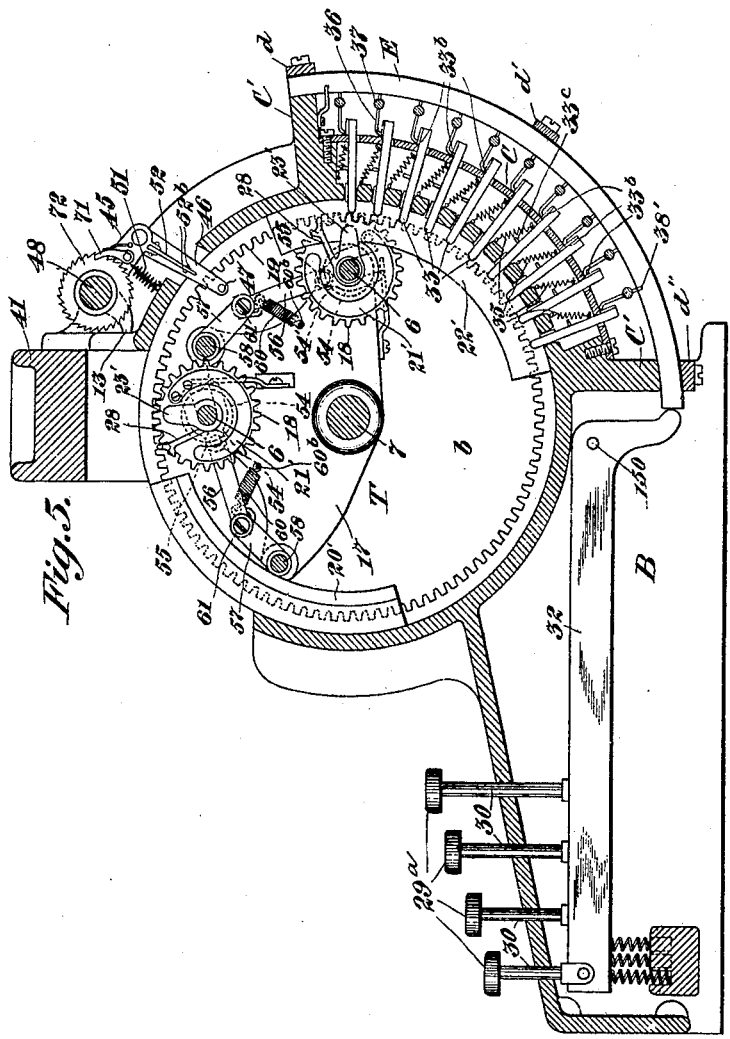
Witnesses:
Inventor,

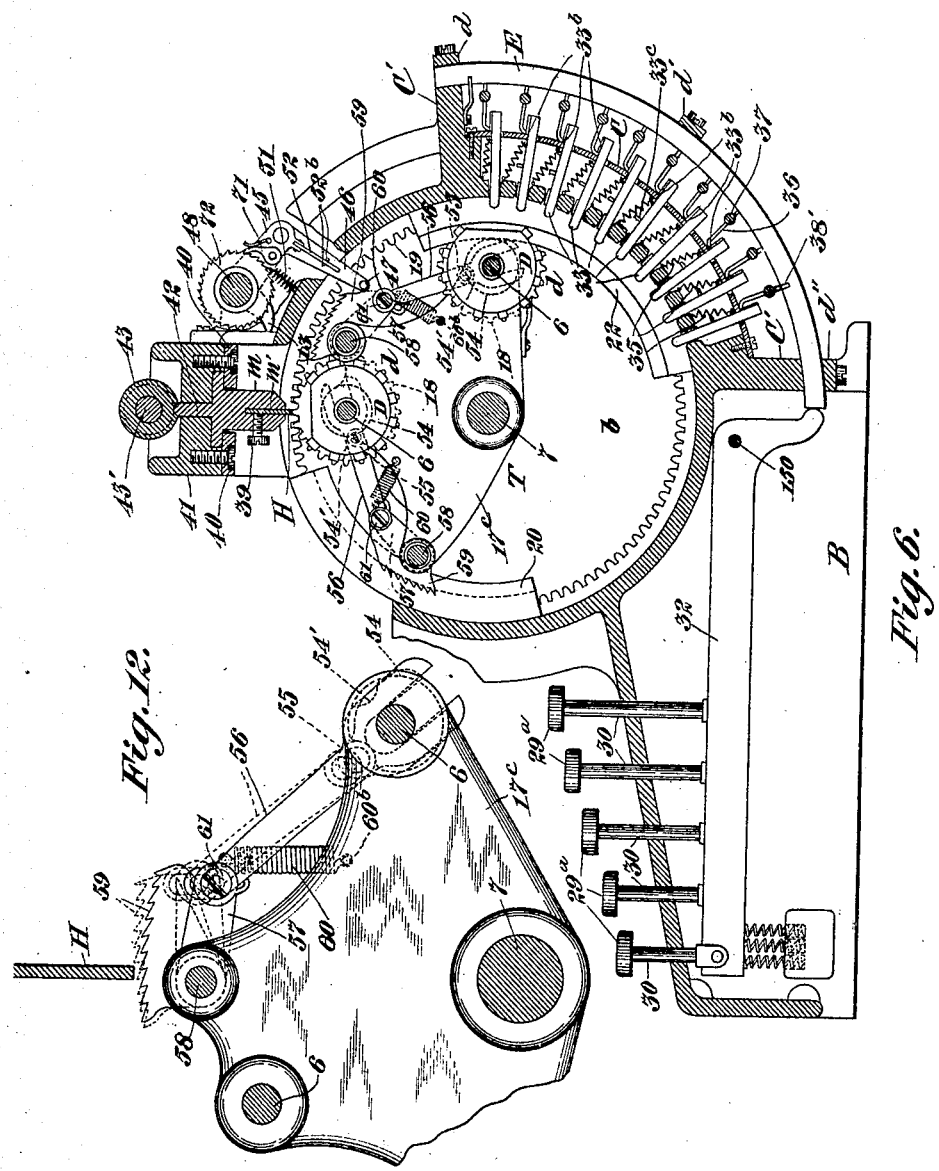

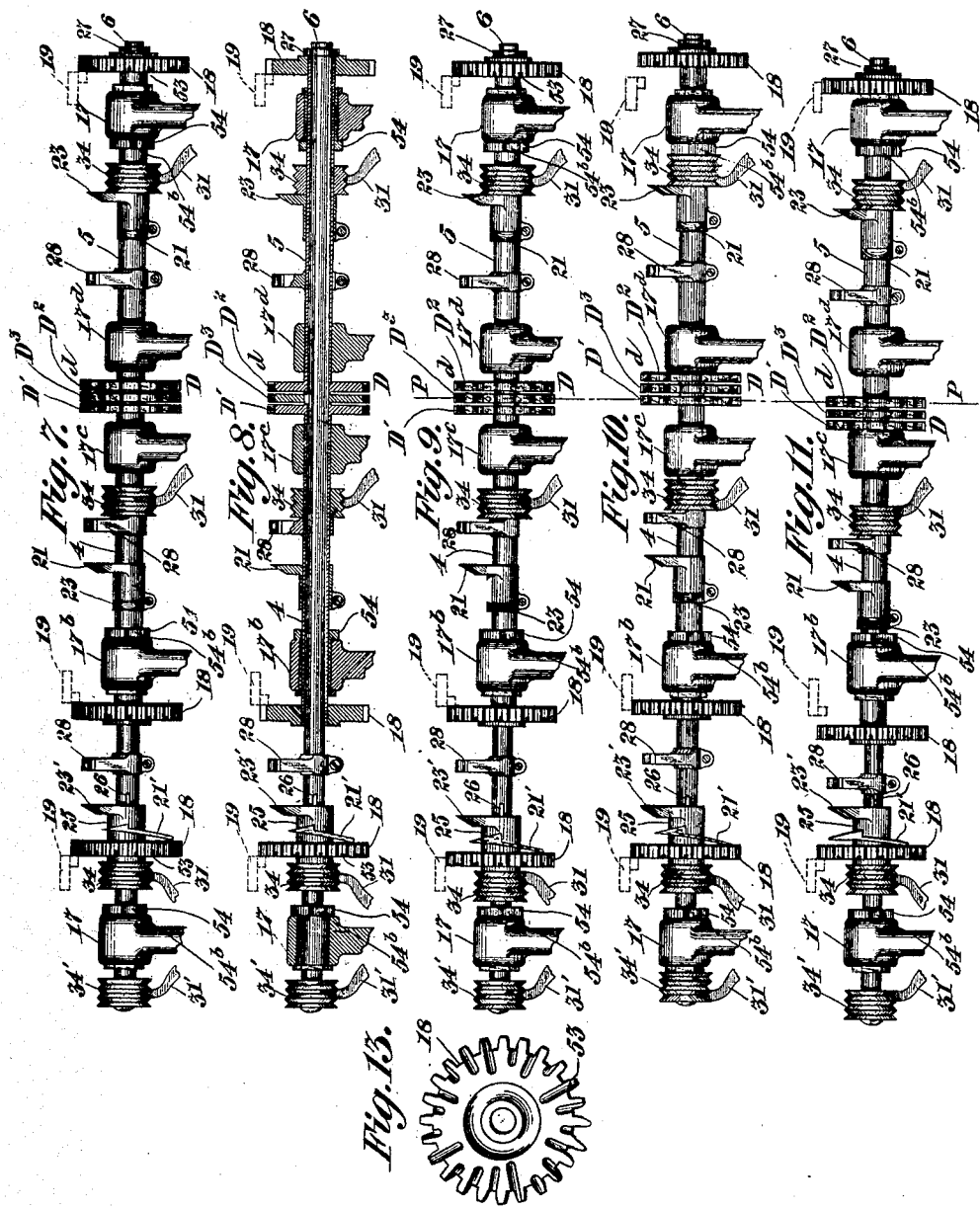

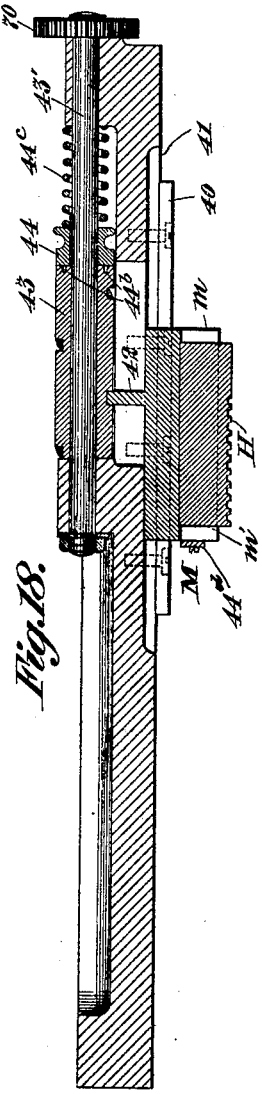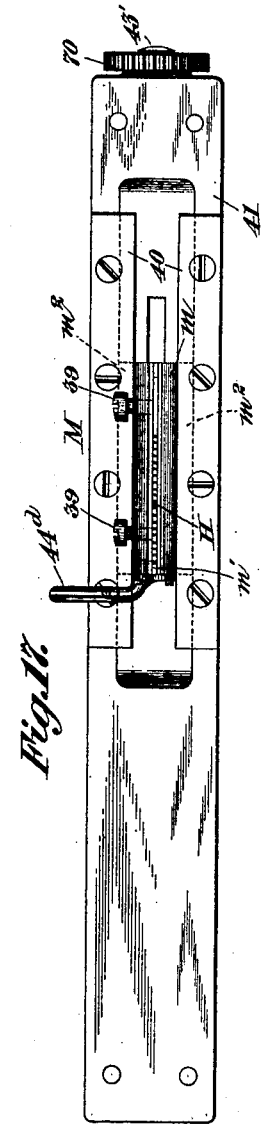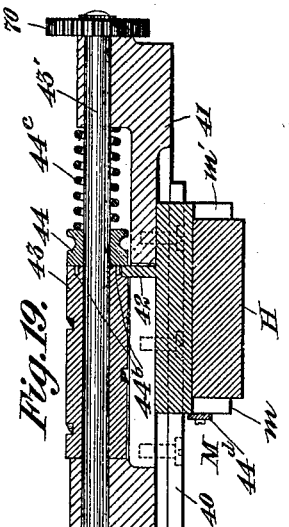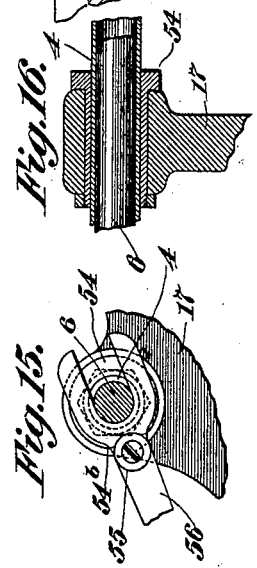

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF NEW JERSEY.

TYPOGRAPHIC MACHINE.

No. 916,488.          Specification of Letters Patent.          Patented March 30, 1909.

Application filed April 18, 1901, Serial No. 56,479. Renewed August 7, 1907. Serial No. 387,424.

*To all whom it may concern:*

Be it known that I, FRANCIS H. RICHARDS, a citizen of the United States, residing at Hartford, in the county of Hartford and State of Connecticut, have invented certain new and useful Improvements in Typographic Machines, of which the following is a specification.

This invention relates in general to typographic-machines or machines capable of making impressions through the medium of suitable instrumentalities, and particularly to machines operating to form a succession of types by the successive application of dies to the edge of a suitable blank to form a typebar.

It is an object of the present invention to furnish a machine of this general class which may be provided with a large number of impression devices and is adapted for making a large number of impressions while keeping the size and mass of the impression mechanism relatively small and capable of operation at a high velocity.

In carrying out my present invention, a plurality of impression devices are disposed in one or more sets, each set comprising one or more of such devices normally lying in a fixed plane and one or more normally located on each side of that plane, but shiftable thereinto when it is desired that they shall operate to form an impression. To permit of this movement and other motions of which they are capable, the impression devices are conveniently mounted upon one or more sectional carriers, the sections of each of which sectional carriers constitute a set of carriers and are affixed to a corresponding set of concentrically disposed shafts. When an impression device normally located at the side of the fixed plane is to be operated, the shaft upon which it is carried when it is started rotating (or at some other time before it operates) is shifted with other shafts in that set lengthwise or axially to its proper axial operative position, and after the device has operated to form an impression the several shafts are returned to their original axial positions. A similar operation takes place when an impression device on the other side of the plane is to be used.

According to the present organization, the aforesaid shafts are disposed upon opposite sides of the aforementioned fixed plane, thus distinguishing from the organization disclosed in my pending application Serial No. 42,599, filed January 9, 1901, in which the main portions of all the shafts together with the associated selective mechanism, are disposed upon the same side of the fixed or operative plane.

The invention embodies, also, in combination with the foregoing, a selective mechanism whereby any particular impression device may be caused to perform its function to the exclusion of all others, the operation of any impression device being therefore under control.

A machine embodying the various features of the present invention is set forth in the following specification with the aid of the accompanying drawings, in which—

Figure 1 is a plan view of such a machine. Fig. 2 is an elevation of the right-hand end thereof as set forth in Fig. 1. Fig. 3 is an elevational view of the rear of the machine. Fig. 4 is a view partly in section and partly in plan, the plane of the section being that indicated by the line 4—4 in Fig. 2. Fig. 5 is a vertical cross section on the plane of the line 5—5 in Fig. 1, looking in the direction of the arrow adjacent to that line. Fig. 6 is a similar section on the line 6—6 in Fig. 1, looking in the direction of the arrow adjacent to that line. Fig. 7 is an elevational view of a set of die-wheels showing the shafts upon which the die-wheels are mounted and various accessory parts. Fig. 8 is a longitudinal section through certain of the parts as shown in Fig. 7. Fig. 9 is a view similar to Fig. 7, but shows certain of the parts shifted for the purpose of bringing into operative position a die normally located in the fixed plane. Figs. 10 and 11 represent certain other parts in their shifted positions, which positions they are caused to assume for the purpose of bringing dies normally located upon opposite sides of the fixed plane thereinto. Fig. 12 is a view of a detail upon a somewhat enlarged scale illustrating means for slotting the edge of a blank crosswise to remove excess material between type-blocks and set off one of the same. Fig. 13 is a view of the radial face of a gear-wheel illustrating a construction thereof for effecting the various feed movements of a blank. Fig. 14 is a perspective view upon a somewhat enlarged scale of a certain feed-arm. Fig. 15 is an enlarged view of a detail for effecting the adjustment to an operative position of the slotting device. Fig. 16 is a sectional view upon the same scale as that to which Fig. 15 is drawn of certain of the parts indicated in the latter figure. Fig. 17 is a bottom view of a work or blank holder with its guides and certain of its associated parts. Fig. 18 is a longitudinal, central section through the parts shown in Fig. 17. Fig. 19 is a view similar to the right-hand end of Fig. 18, but shows the parts in another position with the blank-holder ready to begin its step-by-step or forward feed movement.

Similar characters of reference designate corresponding parts in all the figures of the drawings.

An organization is shown adapting the features of the present invention to use in a machine for making typebars, but the invention is not limited, it will be understood, to such particular embodiment, it being applicable in whole or in part as respects its various features to typographic-machines in general or machines in which an impression device is designed to operate upon or affect a certain surface.

The impression devices designated in a general way by $d$ in the machine taken for the purposes of illustration and to exhibit an embodiment of the invention in a type-bar-machine are dies of suitable form and construction, and, as to the manner of their operation in the present instance, they are designed to produce types by rolling over the edge of a blank in a direction transverse to the length thereof. These dies, to enable this mode of operation to be effected, may be conveniently mounted upon the periphery of a plurality of annular die-carriers or die-wheels, designated in a general way by D, with a suitable exponential number as set forth in the drawings of the present specification, which die-wheels are disposed according to the present invention, when in their normal or inoperative positions, both within a fixed plane, (hereinafter referred to as the operative plane,) and on opposite sides thereof and in such relation thereto that the die-wheels at the sides of the plane are susceptible of being shifted axially thereinto. If a set comprising three die-wheels is employed, as shown in the present drawings, one of the die-wheels may be located in the plane, while the other two die-wheels are situated at the sides of the former die-wheel. While three die-wheels are shown as forming a set, it is evident that this number may be altered without departing from the spirit of the invention.

All the die-wheels in a set are shifted axially to bring any particular die-wheel normally at the side of the fixed or operative plane (see line P—P in Figs. 9 to 11, inclusive,) into that plane, and for this purpose they may be conveniently affixed to shafts which extend on each side of the operative plane and are fitted to rotate upon an inner shaft to which the die-wheel normally situated in the operative plane is secured.

The die-wheels are adapted in the present organization to have both a movement in a closed circuit or orbital path and at times a rotary movement about their own axes. In the particular instance illustrated, this closed circuit or orbital movement is that of revolution about an axis exterior to the die-wheels, and for conveniently enabling this double or compound motion to be attained the shafts 4, 5, and 6, carrying the die-wheels D', D², D³, respectively, of a set are shown mounted in a turret or rotary carrier T, which may be rotated by its shaft 7 through the medium of a pulley or band-wheel 8 from a convenient source of power. The bearings of this shaft 7 are supported by or formed in a suitable fixture or fixtures which, in the present instance, form side-frames $b, b$, constituting a portion of the protecting casing inclosing the mechanism and erected from the base or bed plate B. This bed-plate B and the protecting casing, as well as the various frame elements, are of any desired form and suitable construction to support and protect the various operative parts, details, and accessories of the machine.

Such a number of sets of die-wheels as are desired, within the capacity of the turret T, are disposed thereon, being affixed to corresponding sets of shafts. In the particular mounting of a set of shafts shown in the present drawings, the interior shaft 6 of the set passes through and is supported by arms 17, 17 (herein shown in the form of arm-like plates) extending from and secured to the turret shaft 7 adjacent to the ends of the latter, and the exterior or tubular shaft 4 encircling the interior shaft is journaled in an arm-like plate 17ᵇ and passes through an arm 17ᶜ, both of which arms are also rigid with the turret shaft 7, while the exterior or tubular shaft 5 is journaled in an arm-like plate 17ᵈ and passes through one of the arms 17 mentioned as supporting the interior or central shaft 6. The shafts 4, 5, and 6, constituting the set, are not journaled directly in the arms 17, 17, 17ᶜ, but have their bearings in certain sleeves situated in those arms and more particularly referred to hereinafter, while it is evident from the construction that the tubular shafts afford a bearing for the interior shaft.

Each set of associated shafts 4, 5, and 6 is adapted to have an independent rotary motion imparted to each of its component shafts, in addition to the orbital motion which the set may have by virtue of the rotation of the turret T, for the purpose of bringing any particular die upon any of the die-wheels in the set attached to the shafts to the type-forming point. To enable this independent rotary motion to be imparted to the several shafts there is provided in the present construction a gear-wheel, designated in a general way by 18, one for each shaft. As constructed in the present instance, the driver for the gear-wheels 18 consists of an internal gear-wheel, there being a driver for each of the series of shafts, composed of the corresponding shafts in the several sets—that is to say, there is a driver or gear-wheel, designated in a general way by 19, for the series of tubular shafts 4, another for the series of tubular shafts 5, and another for the series of interior or central shafts 6. Each internal gear-wheel 19 is shown as being secured to the casing of the machine, and it affords a positive means when a gear-wheel 18 is engaged with it for effecting a rotation of the latter by virtue of the rotation of the turret.

The endwise or axial movement of each shaft 4 and 5 in each set for moving the attached die-wheel into and withdrawing it from the operative plane is utilized for engaging the gear-wheel 18 on the shaft with and disengaging it from the corresponding internal gear-wheel 19. To effect this endwise movement in one direction there may be combined, as shown in the present instance, with each series of tubular shafts 4 and with each series of tubular shafts 5 a corresponding actuating member or cam 20 with which there is adapted to coöperate a corresponding coacting member or cam-arm 21, one for each shaft in the corresponding series, for shifting the shaft toward and bringing the corresponding die-wheel into the operative plane and simultaneously engaging its gear-wheel 18. It will be manifest, since the die-wheels carried by one of the mentioned series of shafts normally lie, in the illustrated and described organization, upon one side of the operative plane and the die-wheels carried by the other series of shafts upon the other side of the operative plane, that the two series of shafts move in opposite directions in approaching this plane; hence the cams 20 for the two series will face in opposite directions.

For returning the shafts in the two series a similar mechanism may be employed, there being an actuating member or cam 22, one for each series, with which is adapted to coöperate a coacting member or cam-arm 23 projecting from each shaft, accomplishing in a similar manner the shifting of the shaft backward and the withdrawal of its attached die-wheel from said plane and effecting, moreover, the disengagement of the gear-wheel. These cams 22 for the two series of shafts also, it will be understood, are oppositely-facing. Although here shown as being of a comparatively rigid construction, each arm in any one of these two series of cam-arms 21 and 23, preferably the cam-arms 21, may have its operative surface disposed at the end of a flexible or spring-like strip like the corresponding cam arm extending from each sleeve concerned in effecting the rotary movement of the intermediate die wheel, and to be presently described. This mode of supporting the operative portion will tend to suppress the violence of the shock when the parts come in contact and insure the quiet engagement of the teeth of the gear-wheels notwithstanding the fact that when first brought into contact they are not in alinement.

As has already been stated, when the die-wheels on any set of associated shafts are in their normal or inoperative positions the intermediate die-wheel attached to the interior or central shaft 6 lies in the operative plane, as here organized and as shown in Figs. 7 and 8. It is not necessary, therefore, to shift the intermediate die-wheel of a set axially when it is desired to set it in rotation, and in fact such a shifting it is evident would prevent the operation of a selected die at the designed point in the operative plane. To effect the rotation of any central shaft and thereby its attached die-wheel, the gear-wheel 18 for this purpose is shown mounted upon a sleeve 25 movable along the shaft, but fixed thereto so far as respects any relative rotary movement by means of a key or feather 26 extending axially of the central shaft along which the sleeve 25 may slide backward and forward or conversely as regards a similar movement of the shaft. The several sleeves 25 may be shifted axially by means similar to those already described for effecting a like movement of a series of shafts. If such be the construction there may be combined with the series of sleeves a coacting member or cam 20', with which is adapted to coöperate a coacting member or cam-arm 21' similar to the cam and cam-arms 20 and 21 already described. For moving the sleeves in the opposite direction there may be a coacting member or cam 22', with which is adapted to coöperate a coacting member or cam-arm 23' on each sleeve similar to the cam and cam-arm 22 and 23 already described. The operative portion of each cam-arm 21' is shown supported upon a spring-like strip attached to the gear-wheel of the sleeve, the advantage of this construction having previously been set forth.

For holding each sleeve 25 in a position to which it may be adjusted axially and to prevent its axial movement when either the tubular shaft 4 or the tubular shaft 5 of the corresponding set is shifted to bring its attached die-wheel into the operative plane, there is shown a spring-finger 31 secured at 32 to the end arm 17 and by its resiliency causing the angular end portion or detent of the finger to engage with a circumferentially-notched retaining disk 34 on the sleeve. This finger 31 and disk 34 are so formed and so coöperate with each other as to resist the displacement of the angular portion from one notch in the disk to an adjacent notch, but they do not prevent the axial movement of the wheel when sufficient force is exerted through the operation of the shifting cams 20' and 22' to effect the transfer.

The cams 20 and 22 for each set of tubular shafts and the cams 20' and 22' for the series of sleeves 25 may be attached to the casing and are located in the proper positions to coöperate with their respective arms, while the distance each causes a shaft or sleeve to move axially is sufficient to carry the other arm on the shaft or sleeve which coacts with the other cam to a point where contact of this latter arm will take place with its cam when the shaft or sleeve has been swung around to render the arm operative. The two cams 20 and 22 for each series of shafts and the cams 20' and 22' for the sleeves 25 are arranged, in other words, upon substantially diametrically-opposite sides of the circle in which the operative ends of their cam-arms move, (see Fig. 6, for instance,) while each cam is of a length sufficient to insure the contact and the proper operation of the coacting arm with it as the shaft or sleeve rotates on its own axis and revolves about the axis of the turret. As a result a movement of the shaft or sleeve to-and-fro for each rotation of the turret T is produced.

It will be understood from the described operation of the die-wheels that during the axial shifting of a set to bring either of the die-wheels at the side of the intermediate die-wheel into the operative plane, the several shafts in the set move as a unit; that is, when a tubular shaft is shifted axially for this purpose it pushes, by reason of the contact of its inner face with the intermediate die-wheel or the hub of the latter, the other two shafts in the direction of its movement, and for the purpose of causing the return of the other two shafts when this die-wheel is shifted backwardly from the operative plane, there is provided at the end of each shaft a collar 27 secured to the central shaft 6 and against which the tubular shaft on that side abuts.

For retaining a set of shafts in the normal position with the central die-wheel in the operative plane, and for also retaining the shifted shafts in their shifted positions to the right or to the left, a device similar to that serving a corresponding purpose for the sleeves 25 may be combined with the central shaft, see at the left-hand in Figs. 7 to 11, inclusive, and comprising, as before, a spring-finger 31' whose detent portion is adapted to engage, by reason of the resiliency of the finger, with any one of the series of circumferential notches provided in the disk 34' attached to that shaft. So far as the retention of a set of shafts in their respective axial positions are concerned, one of these retaining devices suffices, but there is shown in the figures of the present drawings a spring-finger and a corresponding circumferentially-notched disk attached to each tubular shaft 4 and 5 in the set a duplication designed particularly for the purpose of retaining the shafts in their shifted positions despite the fact that there may exist looseness resulting from wear or other causes between the abutting surfaces operating to cause the shafts to shift axially as a unit.

For initiating the rotary movement of the individual shafts 4, 5, and 6, and with the latter the sleeve 25 and thereby causing the swinging of the arms 21 and 21' into a position in which they may coact with their proper cams, there is provided on each shaft in the set a starting-arm 28 operating substantially in the manner set forth in Patents Nos. 431,371 and 573,620, granted to me on April 16, 1889, and December 22, 1896, respectively, which patents may be consulted for a more detailed description of its construction and mode of operation. Suffice it here to say that the starting-arms 28 associated with the shafts in a set of the same are arranged in different planes transverse to the axis of rotation of the turret and all the starting-arms for any set of associated shafts are arranged in different planes to the starting-arms extending from the shafts in any other set.

Referring now to the selective mechanism whereby a particular shaft may be set in rotation and the amount of such rotation that shall occur up to a fixed point in the operative plane where a die is to operate be under control, these results may be attained by the employment of a series of latch mechanisms, the tripping of any one of which will cause a reciprocative latch or bolt to protrude into the path of the revolving starting-arm, which engaging therewith turns the shaft in its bearing, this action of the shaft effecting the resetting of the latch however in the manner set forth in the aforesaid patents. Any suitable mechanism of this character may be employed or that particular organization thereof to be described.

Each latch mechanism, in the form thereof herein shown, is caused to operate by means of a corresponding spring-returned rock-lever 32 actuated by the pressure of the finger upon a key adjacent to its outer end. The rock-levers may all be fulcrumed at the rear of the case, for instance, by a rod 150, and may each have a push-rod 30 extending upward through an opening in the front of the casing and provided at its top with a finger-piece or key 29ª. There will be as many latches of bolts in the latch mechanisms designed to actuate any single shaft supported on the turret T as there are dies upon the die-wheel affixed to that particular shaft. Furthermore, these latches are arranged at different distances from the point at which the dies operate, for the purpose of initiating the rotary movement of the shaft at different fixed distances from said fixed or operative point. The latch mechanisms for initiating the rotary movements of a shaft are all located in the same plane in which the starting-arm 28 thereon swings, while this latter is made of a width sufficient to preclude its passing to one side free of the latch despite the axial shifting of the shaft to which the arm is attached.

In Figs. 5 and 6 there are shown ten separate latches substantially in the same plane, but of course this number may be increased or diminished according to the number of dies it is desired that each die-wheel shall have. The latches for operating the several shafts mounted in the turret T may be conveniently located in suitable framing so formed and located as to permit the inner ends of the latches or bolts therein to be disposed circularly or concentrically with reference to the axis of the turret T. Each latch mechanism, as constructed in the present machine, comprises a bolt or latch 33 fitted to slide through a suitable opening or openings in the latch framing (in the present embodiment shown as formed, in part, by the annular casing inclosing the turret) toward and away from the turret axis, and each latch is held in its inoperative or retracted position by a shoulder $33^b$ thereon, which is adapetd to fit over the edge of the opening in a retaining and guiding plate C forming part of the latch framing. Each latch is thus prevented from being thrown inward or set under the tension of a corresponding spring 35 by reason of the contact of the shoulder with the edge of the opening.

It will be noticed particularly in Figs. 5 and 6 that each spring 35 is disposed angularly with respect to the latch with which it is connected, thus tending to pull the latch to one side and cause the engagement of the shoulder $33^b$ with the edge of the opening in the retaining plate; the opening through which the latch extends is, however, sufficiently wide to enable this shoulder to clear the edge of the opening when the latch is pushed laterally to disengage the shoulder by means to be described, a stop $33^c$ on each latch limiting the inward movement thereof. A suitable means for effecting the actuation of the latches as the result of the depression of the keys $29^a$ is provided, and in the form shown in the present instance, this means comprises an actuator designated in a general way by E one for each latch and against which the angle-end of the corresponding rock-lever bears. As shown particularly in Figs. 5 and 6, each actuator E is in the form of a curved rod adapted to slide through suitable guideways formed in extensions C', C' of the casing of the machine, being retained therein by cross bars $d$, $d'$, $d''$ and operatively connected with its corresponding latch by means of a tripping finger 36 extending from a rock-shaft 37 journaled in the side supports 38, 38 and bearing at its free end against the latch, while the shaft is connected to its actuator by an arm 38' which enters a notch in the former. A sliding movement imparted to the actuator serves to rock the shaft and thereby press the shoulder on the latch away from the edge of the opening in the retaining plate C.

The present application of the invention being that of a machine suitable for the formation upon an appropriate typebar-blank of successive types, mechanism is illustrated for imparting a feed movement to a work-holder suitable for supporting a blank. In the present instance this work-holder is disposed at the upper portion of the machine in such position as to bring the edge of the continued blank into proper relation to the rotating and revolving die-wheels. In the form set forth in the present machine, this work-holder, designated in a general way by M, consists of a block $m$ provided with a slot $m'$ in which a blank, designated generally by H, and whatever may be its form and construction may be clamped by suitable means, for instance, screws 39, 39 as shown, and which block is adapted to have a movement in the direction of its slot in suitable guideways. The guides and guideways are formed in the present instance by extending the sides of the block (see $m^2$, $m^2$) and securing these extensions within the guideways by gibs 40 fastened to a work-holder frame 41 secured at its opposite ends to the side-frames $b$, $b$. Projecting from the block $m$ is a finger 42 which enters the groove of a feed-screw 43 adapted to be rotated from mechanism of the machine and thereby effect a longitudinal movement of the block. The driving-shaft 43' of this feed-screw is journaled in suitable bearings, which in the present case are formed in the work-holder frame, but preferably to enable the work-holder to be shifted to its original position corresponding to that in which the first type on the blank is made, the screw is detachably secured to its shaft. The means for this purpose set forth in the present instance comprises a locking-disk 44 splined to the driving-shaft of the feed-screw and provided with one or more pins $44^b$ adapted to enter corresponding recesses or sockets in the end of the feed-screw. Engagement between these pins and the recesses of the feed-screw normally exists through the tension of a spring $44^c$ encircling the driving-shaft and located between the face of the feed-screw bearing and the end of the disk. When the disk is moved backward against the tension of the spring—by hand, for instance—disengaging the pins from the recesses in the screw, the work-holder may be slid backward by a convenient handle 44ᵈ, the feed-screw freely revolving during this movement.

The feed-screw driving-shaft 43 is provided with a gear-wheel 70, which is herein actuated by and from mechanism as follows: Supported at the end of a swinging lever 45 is a floating arm 46 provided with a laterally-extending pin or projection 47 which is adapted to contact with and be moved by a shoulder upon a feed-wheel or disk for the purpose of accomplishing an intermittent feed movement of the feed-screw shaft. Normally, (assuming that the turret T is rotated, but that no die-wheel has been set in rotation to effect the making of a type,) there is no contact of a pin 47 with a shoulder upon the feed-wheel or disk, but when the die-wheel has been shifted into the operative plane or the gear-wheel or a sleeve 25 into engagement with its driver, contact will be made some time during the resulting orbital and rotary movement between a shoulder upon a corresponding feed-wheel or disk and a pin or projection 47. There is a separate swinging lever 45 and a floating arm 46 supplied with a pin or projection 47 for each of the series of die-wheels—or, in other words—each series of tubular shafts 4, tubular shafts 5, and central shafts 6. These swinging levers 45 are fulcrumed to a shaft 48 mounted in suitable bearings supported by the casing. The rotation of each swinging lever in one direction past a predetermined point is prevented by a corresponding stop 13, while a suitable spring 51 constantly urges the lever to this particular position. Each swinging arm is provided with a spring-pressed pawl 71 which coöperates with a corresponding ratchet-wheel 72 to turn the shaft 48, and a gear-wheel 72' on this shaft serves through an intermediate gear-wheel 73 to transmit motion to gear-wheel 70 on the feed-screw shaft.

Normally, or while each swinging arm is in its predetermined position and is not being swung about its fulcrum, the position of and the direction taken by a floating arm 46 may be (if a feed before a type-forming operation is desired) as shown in Fig. 6, where it is seen located on that side of the work-holder toward which the turret is moving when the latter is rotating. The floating arm, however, may not only be moved upward in the manner pointed out below to turn the shaft 48, but may also be deflected from its normal position relative to the lever 45, being designed to return to its normal position automatically when free so to do. To bring about this return movement, it may be provided with an elastic finger 52 confined between stops 52ᵇ, 52ᵇ.

The feed disks or wheels mentioned as coöperating with the pins 47 may each consist of a separate and independent disk attached to each shaft and sleeve, or the gear-wheel 18 upon each shaft and sleeve may perform the office of such feed-disk as herein illustrated. The shoulders stated as coacting with the pin 47 are formed, as shown, by notching the radial face of each gear-wheel, the notches being indicated generally by 53, or such shoulder may be formed by the bottom of a gear-wheel tooth, which for this purpose may be regarded as forming a notch. Each floating arm 46 is arranged adjacent to that series of feed-wheels, or, as herein shown, gear-wheels 18 with which it is designed to coöperate, and upon that side of the gear-wheels toward which they are shifted to engage with the driving-gear 19, contact of the pin taking place with a shoulder on the feed or gear wheel at some time during the axial movement. The lateral freedom of movement of each pin 47 permits it to readily seat itself in the bottom of a notch 53, whereupon further orbital and rotary movement of the gear-wheel causes the elevation of the floating arm 46 from which the pin 47 extends and a consequent partial rotation of the shaft 48 to which the arm is fulcrumed through the engaging pawl and ratchet construction. Finally, as the gear-wheel continues its double circular movement, the pin 47 is rolled out of its notch, the floating arm 46 deflecting with reference to the swinging lever 45, and the spring 51 and finger 52 return the parts to their original position.

A movement of a floating arm may take place, if so desired, each time the engagement of a gear-wheel 18 with its driver 19 occurs, and hence a feeding movement results for each movement of the die-wheel in bringing a die to the type-forming point. A variation in the amount or degree of this feeding movement may be required where dies of varying width are used, which may be secured by altering the radial depth of the notches upon the feed-wheel or gear-wheel 18, resulting therefore in the turning of the shaft 48 through different amounts of angular movement. It will be understood, therefore, from the foregoing that the entrance of a pin 47 into a particular notch 53 corresponds to the appearance of a particular die at the fixed or type-forming point.

There is shown in the present embodiment a device for slotting the edge of the blank at the side of that portion which will come under the next selected die; that is to say, a device for isolating this portion from the type last made and removing excess material not needed in the formation of the type to thus provide a space into which flowage of the material induced by the working die may extend. Such device is shown in the form of a saw (one for each set of associated shafts) adapted to operate prior to the operation of the selected die and to be moved into an operative position by the rotation of the shaft to which the die-wheel of that die is secured. When such shaft is started rotating, a concentric bushing 54, (there being a separate bushing for each shaft,) which is journaled in one of the turret arm-plates supporting the shaft and splined to the shaft, is also set in rotation. Each bushing is provided with a cam portion $54^b$ against which bears an anti-friction or cam-roller 55 extending from a corresponding link 56 bifurcated at one end and embracing the shaft, as shown plainly in Fig. 12, and at the other end loosely pivoted to an arm 57 attached to a corresponding shaft 58 journaled in the arm-like plates of the turret and provided with a saw 59 suitable for slotting the edge of the blank when drawn across it by the rotating turret. As stated, there is a link 56 and a cam portion $54^b$ for each shaft in a set, and consequently when any shaft is started rotating it will result in the turning of the shaft 58 from which the saw extends. Each link is provided with a spring 60 connected to a suitable pin, as $60^b$, thereon and fastened at the other end to a fixed part of the turret to hold the cam-roller 55 on the link in engagement with its cam. It will be noticed, particularly in Fig. 12, that the end of the arm connecting with the link is slotted and that the pivot pin 61 extending from the link is normally situated at the top of the slot. When therefore any particular die-wheel shaft is started rotating, the link actuating the saw-shaft will be actuated, tilting the saw from a position in which it moves free of the blank during the rotation of the turret, as indicated in full lines in Fig. 12, to a position in which it is adapted to enter the edge of the blank and ultimately form a slot therein, which latter position is indicated in a general way by the dotted lines in that figure. The other arms extending from that particular saw-shaft and whose pins enter the links operable from the other shafts will simply rise and carry their pins lengthwise of the slots in the links without in any way actuating the latter. When through the further rotation of the bushing the link is withdrawn to its normal position by the spring 60 attached to it, the shaft from which the saw extends will be rotated to carry the saw into a position where it will not contact with the blank by the tension of the helical spring 62 encircling the shaft and connected to a fixed portion of the turret and a collar $62^b$, for instance, on the shaft. Each link 56 is also utilized in the present instance for retaining its actuating shaft in its normal rotarial position and for bringing the shaft to rest after it has been actuated and a die caused to form a type. A projection on the link for this purpose, the cam-roller 55 in the present instance constituting this projection, is adapted to coöperate with a corresponding depression $55^b$ in the cam portion and by the pressure exerted between the two operating by a brake-like action to stop the rotation of the bushing and the shaft eventually with the cam-roller seated in the recess. For the production of the spaces between letters and words, a solid die operating in a similar manner to the type-forming dies may be used controllable from a key on the key-board. A recessed portion 250 is provided on one or all of the die-wheels to insure the clearance of the blank by the die-wheels as the latter are revolved by the rotating turret in their normal position.

The operation of a machine constructed and organized in accordance with the foregoing is substantially as follows: Assuming that a key $29^a$ has been depressed, thereby actuating the rock-lever 32 to which it is attached, a corresponding latch 33 is permitted to be thrown forward by the attached spring 35 and the first starting-arm 28 in the plane of that latch to reach it will engage with its end. The continued rotation of the turret T causes the engaged starting-arm to swing around, as also its shaft, and assuming that a tubular or outside shaft is actuated, this initial rotation results in the contact of the cam-arm 21 with the inclined surface of cam 20. Gear-wheel 18 and its shaft now move endwise, carrying the other shafts in the set bodily or as a unit with them, and the die-wheel on the shaft whose arm has been operated is shifted into the operative plane, while the gear-wheel 18 simultaneously meshes with the driver 19. The detent on the corresponding spring finger 31 springs into the proper groove in the retaining disk 34, maintaining the parts in this axial position. Rotation of the said shaft now takes place, the continuous swinging of the starting-arm causing the resetting of the latch until that die on the actuated die-wheel to which the particular operated key is referable has reached the blank or other fixed point where it is designed that the die shall operate, whereupon the latter rolls across the surface of the blank there located and forms a type or space. Just before reaching this point, however, the saw 59 which has been shifted outwardly to its operative position, will cross-slot the blank at a point immediately at the side of the type last formed, following which action the corresponding pin 47 will enter a predetermined notch 53 in the feed-wheel, whose function is performed, as already explained, by the gear-wheel 18 and the shaft 48 is turned in its bearings to cause a feed in the manner already described. As the pin 47 rolls out and becomes free of the particular notch into which it has entered to effect the feed, the shaft 48, etc., are returned to their normal positions by the spring 51 and the elastic finger 52. Soon after this, by reason of the continued rotation and revolution, the cam-arm 23 contacts with its cam 22 and the die-wheel shaft being free to move endwise is shifted back to its original position, the retaining detent springing back into the proper groove. The gear-wheel 18 is withdrawn from the driver 19 simultaneously with this return movement and the shaft is brought to rest in its normal angular position by the cam-roller 55 as it coacts with the depression 55$^b$ in the cam portion, as aforesaid. Coincident with the disengagement of the gear-wheel 18 the die-wheel shifts out of the operative plane, leaving the intermediate die-wheel therein. If, on the other hand, a die-wheel on a central shaft 6 is the one that will respond to the depression of the key, this shaft is not shifted axially, since the die-wheel attached thereto normally lies in the operative plane, as previously described. The only result of the engagement of the cam 20' and the cam-arm 21', due to the swinging of the starting-arm 28 of the sleeve on this shaft, will be the shifting of the sleeve axially along the interior shaft and the carrying of the gear-wheel attached to the sleeve into engagement with the driver 19. Rotation is then imparted from this gear-wheel 18 to the shaft and the actuation of a die followed by a return movement ensues in the manner already described. A feeding movement prior to the operation of the die occurs, as before pointed out.

Having described my invention, I claim—

1. The combination, with a carrier adapted to move in a closed circuit or orbital path, of a set of shafts mounted one within the other and which are capable of independent rotation, and means located upon opposite sides of a fixed plane for moving the set of shafts as a unit in opposite positions with respect to said plane.

2. The combination, with a carrier adapted to move in a closed circuit or orbital path, of a set of shafts mounted one within the other and which are capable of independent rotation; die-wheels attached to said shafts; and means located upon opposite sides of a fixed plane for moving the set of shafts as a unit in opposite directions with respect to said plane.

3. The combination, with a carrier adapted to move in a closed circuit or orbital path, of a set of shafts mounted one within the other and which are capable of independent rotation; die-wheels attached to said shafts; and means located upon opposite sides of a fixed plane for moving the set of shafts as a unit axially in opposite directions with respect to said plane and for rotating a particular shaft in the set.

4. The combination, with a rotary carrier or turret, of a set of shafts mounted one within the other and which are capable of independent rotation, and means located upon opposite sides of a fixed plane for moving the set of shafts as a unit in an opposite direction with respect to said plane.

5. The combination, with a rotary carrier or turret, of a set of shafts mounted one within the other and which are capable of independent rotation; die-wheels attached to said shafts; and means located upon opposite sides of a fixed plane for moving the set of shafts as a unit in an opposite direction with respect to said plane.

6. The combination, with a rotary carrier or turret, of a set of shafts mounted one within the other and which are capable of independent rotation; die-wheels attached to said shafts; and means located upon opposite sides of a fixed plane for moving the set of shafts as a unit in an opposite direction with respect to said plane and for rotating a particular shaft in the set.

7. The combination, with a rotary carrier or turret, of a set of shafts mounted one within the other and which are capable of being shifted axially as a unit; die-wheels attached to said shafts; gear-wheels for rotating each shaft independently of the other; and means located upon opposite sides of the fixed plane for moving a gear-wheel axially for the purpose of rotating a shaft.

8. The combination, with a rotary carrier or turret, of a set of shafts mounted one within the other and which are capable of being shifted axially as a unit; die-wheels attached to said shafts; gear-wheels for rotating each shaft independently of the other; a starting-arm moving in unison with each gear-wheel for initiating the rotary movement thereof; and an actuating member and a coacting member for shifting a gear-wheel axially to effect its continued rotation.

9. The combination, with a rotary carrier or turret, of a set of shafts mounted one within the other and which are capable of being shifted axially in unison; die-wheels attached to said shafts; gear-wheels for rotating each shaft independently of the others; means for driving said gear-wheels; a starting-arm moving in unison with each gear-wheel for initiating the rotary movement thereof; and an actuating member and a coacting member for shifting each gear-wheel axially into engagement with its driver to effect its continued rotation.

10. The combination, with a rotary carrier or turret, of a set of shafts mounted one within the other and which are capable of being shifted axially in unison; die-wheels attached to said shafts; gear-wheels for rotating each shaft independently of the others; means for driving said gear-wheels; a starting-arm moving in unison with each gear-wheel for initiating the rotary movement thereof; selective devices for coacting with each shaft; and an actuating member and coacting member for shifting each gear-wheel axially into engagement with its driver to effect its continued rotation.

11. The combination, with a rotary carrier or turret, of a set of shafts mounted one within the other and which are capable of being shifted axially in unison; die-wheels attached to said shafts; gear-wheels for rotating each shaft independently of the others; means for driving said gear-wheels; a starting-arm moving in unison with each gear-wheel for initiating the rotary movement thereof; selective devices for coacting with each shaft; an actuating member and coacting member for shifting each gear-wheel axially into engagement with its driver to effect its continued rotation; and means for causing a feed movement when a gear-wheel is shifted axially.

12. The combination, with a rotary carrier or turret, of a set of shafts mounted one within the other and which are capable of being shifted axially in unison; die-wheels attached to said shafts; gear-wheels for rotating each shaft independently of the others; means for driving said gear-wheels; a starting-arm moving in unison with each gear-wheel for initiating the rotary movement thereof; selective devices for coacting with each shaft; an actuating member and coacting member for shifting each gear-wheel axially into engagement with its driver to effect its continued rotation; and means comprising a notched disk or wheel for causing a feed movement when a gear-wheel is shifted axially.

13. The combination, with a rotary carrier or turret, of a set of shafts mounted one within the other and which are capable of being shifted axially in unison; die-wheels attached to said shafts; gear-wheels for rotating each shaft independently of the others; means for driving said gear-wheels; a starting-arm moving in unison with each gear-wheel for initiating the rotary movement thereof; selective devices for coacting with each shaft; an actuating member and coacting member for shifting each gear-wheel axially into engagement with its driver to effect its continued rotation; and means comprising a notched disk or wheel, a shaft, and a pin or projection adapted to engage with a notch in the disk and thereby actuate the shaft for causing a feed movement when a gear-wheel is shifted axially.

14. The combination, with a rotary carrier or turret, of a set of shafts mounted one within the other and which are capable of being shifted axially in unison; die-wheels attached to said shafts; gear-wheels for rotating each shaft independently of the others; means for driving said gear-wheels; a starting-arm moving in unison with each gear-wheel for initiating the rotary movement thereof; selective devices for coacting with each shaft; an actuating member and coacting member for shifting each gear-wheel axially into engagement with its driver to effect its continued rotation; and means comprising a series of notches on a gear-wheel, a shaft, and a pin or projection adapted to engage with a notch in the disk and thereby actuate the shaft for causing a feed movement when a gear-wheel is shifted axially.

15. The combination of a central or interior shaft, tubular shafts mounted thereon, and impression devices attached to the shafts, those attached to the central shaft lying normally in a fixed plane.

16. The combination of a central or interior shaft, tubular shafts mounted thereon; impression devices attached to the shafts, those attached to the central shaft lying normally in a fixed plane; and means for holding the shafts in their axial positions.

17. The combination of a central or interior shaft, tubular shafts mounted thereon; impression devices attached to the shafts, those attached to the central shaft lying normally in a fixed plane; means for holding the shafts in their axial positions; and means for stopping a rotating shaft in a given axial position.

18. A typebar-machine having in combination, a central or interior shaft, a tubular shaft mounted thereon; die-wheels attached to the shafts, that attached to the central shaft lying normally in a fixed plane; and means for slotting the edge of a typebar-blank.

19. A typebar-machine having in combination, a central or interior shaft, a tubular shaft mounted thereon; die-wheels attached to the shafts, that attached to the central shaft lying normally in a fixed plane; and means for slotting the edge of a typebar-blank operable from a rotatable shaft.

20. A typebar-machine having in combination, a central or interior shaft, a tubular shaft mounted thereon; die-wheels attached to the shafts, that attached to the central shaft lying normally in a fixed plane; a slotting device, an actuating link, and a cam rotating with a rotating shaft and operating to actuate the link and thereby shift the slotting device into its working position.

21. The combination with a plurality of selective devices assembled in a number of sets and comprising devices located in the plane of the working point, and devices located outside of such plane, of mechanism located on opposite sides of said plane for shifting the plurality of said devices as a unit, to thereby shift a selected device normally located outside the plane into the plane and bring the selected device, to the exclusion of all others to its working position.

22. The combination with a plurality of selective devices assembled in a number of sets and comprising devices located in the plane of the working point and devices located outside of such plane, of mechanism located on opposite sides of said plane for shifting the plurality of said devices as a unit and for shifting each of said sets of devices separately from the other sets to bring the selected device, to the exclusion of all others, to its working position; and a selective mechanism for controlling such unital shifting of the devices and the particular one of said sets shifted.

23. The combination with a plurality of selective devices assembled in a number of sets and comprising devices located in the plane of the working point and devices located outside of such plane, of mechanism located on opposite sides of such plane for simultaneously shifting the plurality of said devices as a unit, and a set of said devices separately from the other sets to bring the selected device, to the exclusion of all others, to its working position; and a selective mechanism for controlling such unital shifting of the devices and the particular one of said sets shifted.

24. The combination with a main carrier comprising a plurality of carrier-sections, of a plurality of selective devices mounted on the main carrier, and comprising a plurality of sets of such devices, each set being mounted upon one of the carrier-sections; and mechanism located on opposite sides of the plane of the working point for shifting the main carrier and for shifting that one of the carrier-sections on which the selected device is mounted, to thereby bring said device, to the exclusion of all others, to its working position.

25. The combination with a main carrier comprising a plurality of rotatably shiftable carrier-sections, of a plurality of selective devices mounted on the main carrier and comprising a plurality of sets of such devices, each set being mounted upon one of the carrier-sections; and mechanism located on opposite sides of the plane of the working point for shifting the main carrier axially to bring that section upon which the selected device is mounted into the plane of the working point and for rotatably shifting such section to bring the selected device to such point.

26. The combination with a rotatable and orbitally movable impression device carrier, of selective mechanism coöperatively related with said carrier for shifting the same rotatably and axially to bring the selected device to the working point.

27. The combination with a plurality of selective devices assembled in a number of sets and comprising devices located in the plane of the working point and devices located outside of such plane, of mechanism located on opposite sides of such plane for shifting the plurality of said devices as a unit to thereby shift a selected device normally located outside the plane into the plane and bring the selected device to the exclusion of all others to its working position, and a blank slotter brought into operative position on the approach of the selected device to its working position.

28. The combination with a plurality of selective devices assembled in a number of sets and comprising devices located in the plane of the working point and devices located outside of such plane, of mechanism located on opposite sides of said plane for shifting the plurality of said devices as a unit, and for shifting each of said sets of devices separately from the other sets, a selective mechanism for controlling such unital shifting of the devices and the particular one of said sets shifted; and a blank slotter brought into its operative position upon the shifting of the selected set of impression devices.

29. The combination with a main carrier comprising a plurality of carrier sections, of a plurality of selective devices mounted on the main carrier and comprising a plurality of sets of such devices, each set being mounted upon one of the carrier sections, mechanism for shifting the main carrier and for shifting that one of the carrier sections on which the selected device is mounted to thereby bring said device to the exclusion of all others to its working position, and a blank slotter brought into its operative position upon the approach of the selected device to such position.

30. The combination with a main carrier comprising a plurality of rotatably shiftable sections, of a plurality of selective devices mounted on the main carrier and comprising a plurality of sets of such devices, each set being mounted upon one of the carrier sections, mechanism for shifting the main carrier axially to bring that section normally out of the plane of the working point and upon which the selected device is mounted into such plane and for rotatably shifting such section to bring the selected device to such point, and a blank slotter brought into its operative position by the rotary shifting of the said section.

31. The combination of a turret, a plurality of impression device carriers mounted thereon, and a blank slotter for each such carrier and operatively connected with the carrier with which it is associated.

32. The combination of a turret, a plurality of impression device carriers mounted thereon, a blank slotter associated with each such carrier, and mechanism connecting each carrier with its blank slotter whereby on the rotary movement of the carrier the blank slotter is shifted to its operative position.

33. The combination with a plurality of members individually rotatable and collectively rotatable, orbitally movable, and axially shiftable, of key controlled selective mechanism coöperatively related with said members, and a starting arm coöperative with said mechanism for shifting the selected member to bring the selected device to the working point.

34. The combination with a set of concentrically disposed members individually rotatable and collectively rotatable, orbitally movable, and axially shiftable, of key controlled selective mechanism coöperative with said members; and a starting arm coöperative with said mechanism for shifting the selected member or set of members to bring a device controlled thereby to the working point.

35. The combination, with a rotary carrier or turret, of a set of shafts mounted one within the other and which are capable of independent rotation; die-wheels attached to said shafts; and means located upon opposite sides of a fixed plane for moving the set of shafts as a unit in an opposite direction with respect to said plane and for rotating a particular shaft in the set in opposition to the rest.

36. The combination of a set of centrifugally disposed shafts collectively shiftable axially and independently shiftable angularly, a starting arm for each shaft, means to individually actuate the shafts axially, and means to collectively actuate the shafts angularly.

37. The combination with a set of concentrically disposed members individually rotatable and collectively rotatable, orbitally movable, and axially shiftable, of a starting arm for shifting the selected member or set of members to bring a device controlled thereby to the working point, and key controlled selective mechanism coöperative with said starting arms.

38. The combination with a set of concentrically disposed members individually rotatable and collectively rotatable, orbitally movable, and axially shiftable, of a starting arm for shifting a selected member or set of members to bring a device controlled thereby to the working point, and key controlled selective mechanism coöperative with said arms.

39. The combination with a set of concentrically disposed members individually rotatable and collectively rotatable, orbitally movable, and axially shiftable, of a starting arm coöperative with said mechanism for shifting the selected member or set of members to bring a device controlled thereby to the working point, and key controlled selective mechanism coöperative with said members.

40. The combination with a set of concentrically disposed members individually rotatable and collectively rotatable, orbitally movable, and axially shiftable, of a starting arm coöperative with said mechanism for shifting the selected member or set of members to bring a device controlled thereby to the working point, and key controlled selective mechanism coöperative with said starting arm.

41. The combination with a set of concentrically disposed work performing wheels or heads, of a shaft for each head, and shiftable axially independently and angularly collectively, a starting arm for each shaft, and means for actuating the wheels or heads axially and angularly.

42. The combination of a set of concentrically disposed die wheels, shiftable axially independently and angularly collectively, a starting arm for each wheel, and means for actuating the shafts axially and angularly.

43. The combination with a rotatable carrier, of shafts mounted thereon at different angular positions, a series of type dies controlled by each of said shafts, a typebar blank holder, means for selectively shifting the shafts for bringing a selective die to working position, a slotter carried by the turret in advance of each of said shaft positions, and means controlled by the shaft rearward of said slotter in its selective movement for actuating the same.

44. The combination with a rotary carrier, of a plurality of die wheels carried thereby at different angular positions, a typebar blank support, means for selectively rotating said die wheels for the purpose of bringing the dies thereon into the working position, a slotter carried by the carrier in advance of each of said die carrying positions, and means connecting each of said slotters with the die wheel located rearward thereof for advancing the slotter into its blank engaging position upon the inauguration of the rotation of said die wheel.

45. The combination with a set of concentrically disposed members individually rotatable and collectively rotatable, orbitally movable, and axially shiftable, of a starting arm for shifting the selected member to bring a selected device to the working point, and selective mechanism coöperative with said starting arm.

46. The combination with a set of concentrically disposed members individually rotatable, and collectively rotatable, orbitally movable, and axially shiftable, of a starter for shifting the selected member to bring a selected device to the working point, and selective mechanism coöperative with said starter.

47. The combination with a plurality of rotatable, orbitally movable, and axially shiftable members, of key controlled selective mechanism coöperatively related with said members, and a starting arm coöperative with said mechanism for shifting the members for bringing a selected device to the working point.

48. In a typographic mechanism, the combination with a central or interior shaft, a tubular shaft mounted thereon, typographic mechanism carried by the respective shafts, that attached to the central shaft normally occupying the fixed plane and means coöperative therewith for slotting the edge of the typebar blank.

FRANCIS H. RICHARDS.

Witnesses:
 FRED. J. DOLE,
 C. E. VOSS.